Jan. 24, 1967  J. P. DRY  3,299,797
COMBINED AIR DIFFUSER AND LIGHTING FIXTURE
Filed Sept. 2, 1964  3 Sheets-Sheet 1
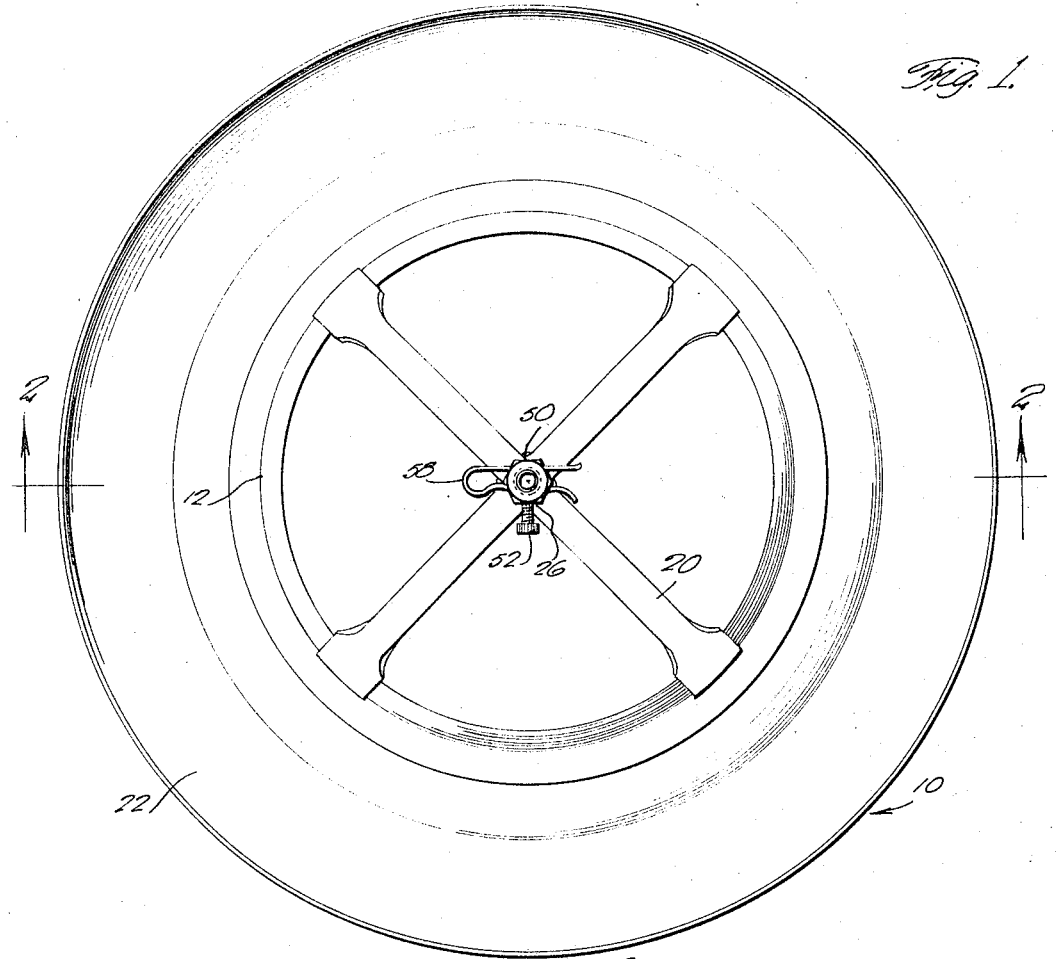
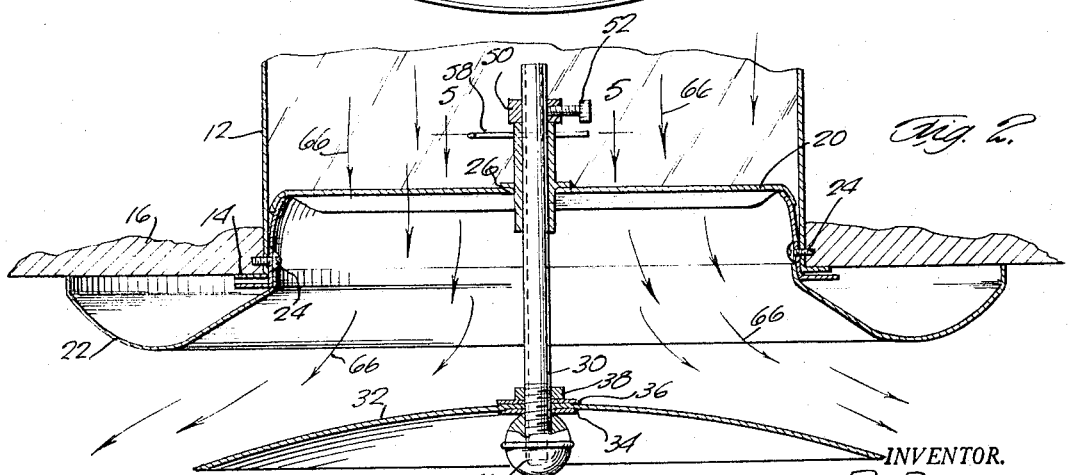
INVENTOR.
JOHN P. DRY
BY Jan. 24, 1967   J. P. DRY   3,299,797
COMBINED AIR DIFFUSER AND LIGHTING FIXTURE
Filed Sept. 2, 1964   3 Sheets-Sheet 2
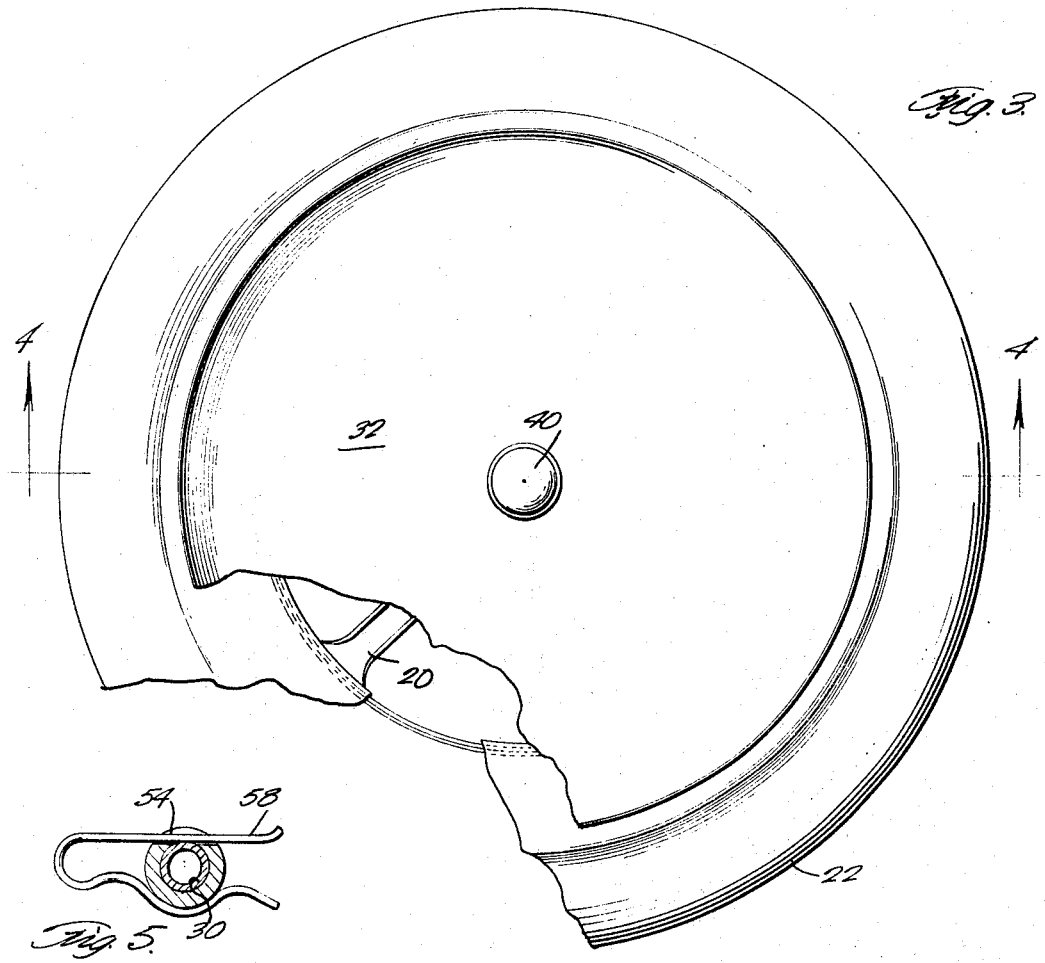
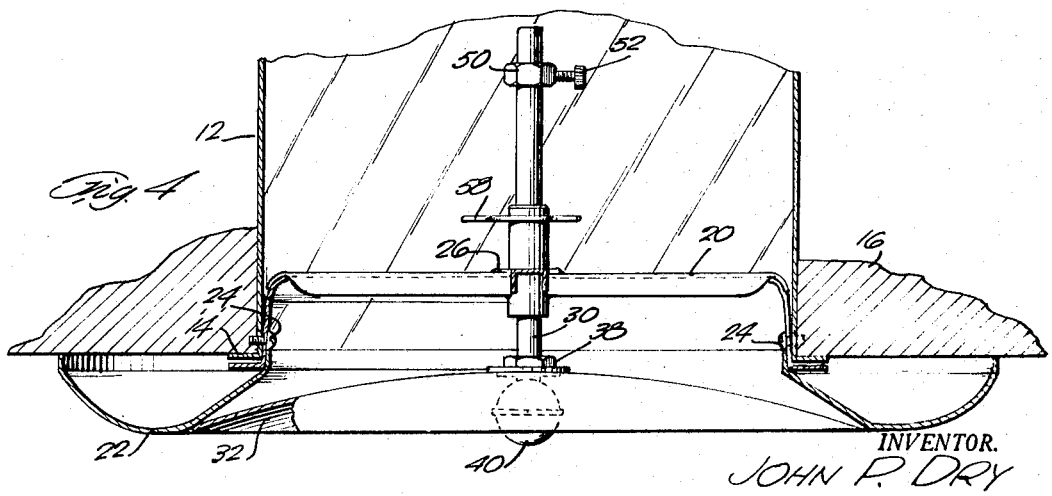
INVENTOR.
JOHN P. DRY
BY
Victor J. Evans & Co.
Attorneys Jan. 24, 1967   J. P. DRY   3,299,797
COMBINED AIR DIFFUSER AND LIGHTING FIXTURE
Filed Sept. 2, 1964   3 Sheets-Sheet 3

INVENTOR.
JOHN P. DRY
BY
Victor J. Evans & Co.
Attorneys

United States Patent Office 3,299,797
Patented Jan. 24, 1967

3,299,797
COMBINED AIR DIFFUSER AND LIGHTING
FIXTURE
John P. Dry, Box 427, Winters, Tex. 79567
Filed Sept. 2, 1964, Ser. No. 393,942
3 Claims. (Cl. 98—40)

The present invention relates to an improved adjustable air diffuser and damper combined with a lighting fixture, and has particular reference to an improved device incorporating the feature of a control air channel that has means providing for the passage of electrical wiring to a light fixture, and in which the lower end of the control channel stem has been fitted with threads so that any type of ordinary lighting fixture may be placed thereon by simply removing an ornamental or control knob. The invention includes a modification of the principal embodiment which provides for omitting a lighting fixture attachment so that the ornamental or control knob may be used in accordance with the flared configuration of the air diffusing component, and in which the diffusing element may be useful as a passive lighting fixture.

The present invention is an improvement over my Patent No. 3,103,869, issued to John P. Dry on September 17, 1963.

An important feature of the invention is that it seeks to eliminate the construction problem that is defined as a conflict between heating and air conditioning contractors and engineers, and the electrical contractor and engineers so that each may be satisfied in installing and designing their preferred equipment in the center or symmetrical position about the room ceiling, in order to obviate and provide the maximum use of the equipment, as well as deriving and realizing an improved ceiling arrangement of the equipment.

A further object and feature of the invention is that the combined diffuser and light fixture of the invention is found to be manufactured, and sold at a lesser price than the price of the two separate equipments when installed separately, and thus further provide a saving in labor charges for the installation thereof.

The invention is defined in terms of providing light bulbs in the flared light diffusion elements, but it is understood and sought to be shown herein that fluorescent lights of various shapes, whether circular in configuration or tubular in form, may similarly be disposed in the flared reflectors and thus provide an attractive and useful equipment.

An object of the invention is to provide a combined air distributor and lighting fitting which keep the observer immediately conscious of the improved utility of the double function of the combined light-diffuser arrangement.

Another object of the invention is to provide an adjustable light diffuser arrangement for use in an air distributor so that there is provided a symmetrical combined unit.

Perhaps the outstanding advantage of the new combined structure resides in the facility of the installation of the equipment, as well as the adjustable air and lighting control features that are provided in movement by the control knob of the equipment.

Other objects and advantages will be apparent from a detailed description of the invention and from the appended drawings and claims. In the drawings:

FIGURE 1 is a bottom plan view looking upwardly towards the equipment, in which there is shown a combined light fixture and air diffuser in accordance with one embodiment of the invention;

FIGURE 2 is a cross-section elevational view taken along line 2—2 of FIGURE 1;

FIGURE 3 is a bottom plan view looking upwardly towards the equipment, of a light fixture and air diffuser according to claim 1 wherein the light diffuser is mounted at the end of the stem;

FIGURE 4 is a cross-sectional elevational view taken along line 4—4 of FIGURE 3;

Figure 6:
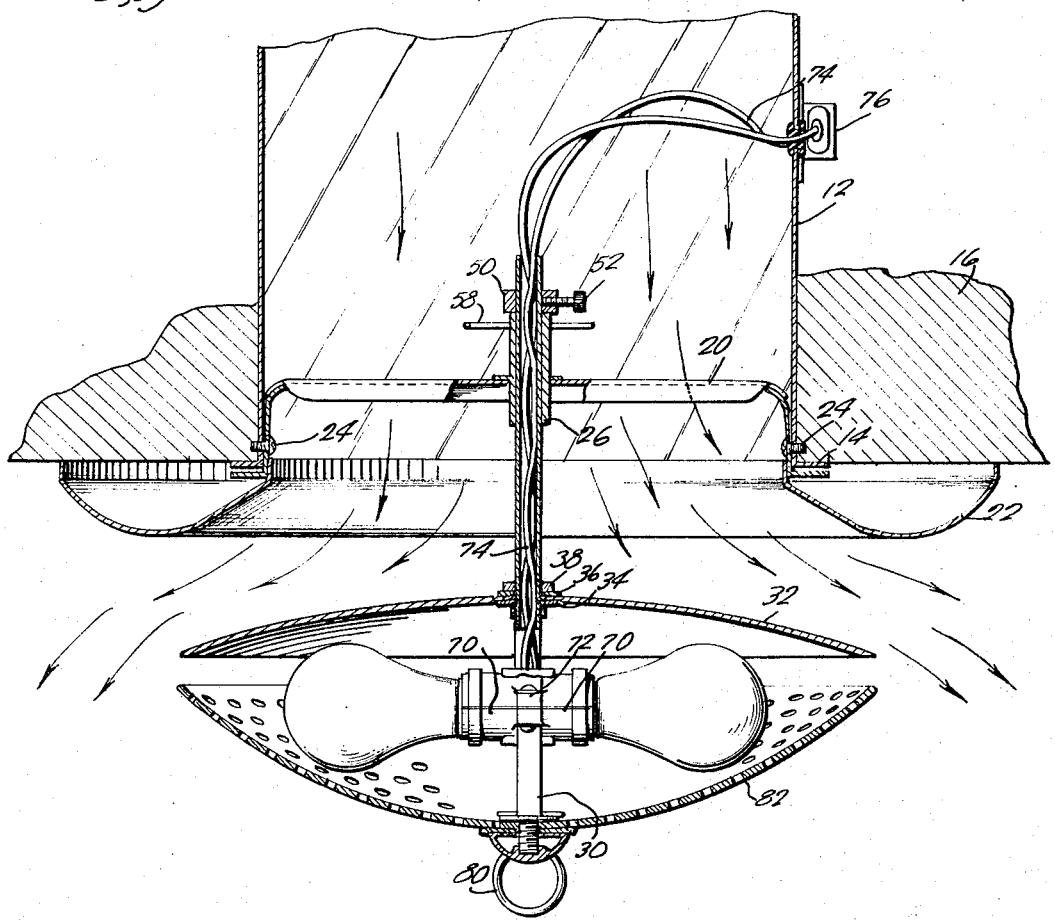

FIGURE 5 is a cross-sectional elevational view of the shaft showing a clip for retaining the stem in place, and taken along line 5—5 of FIGURE 2; and FIGURE 6 is a cross-sectional elevational view of a modified arrangement of a light fixture and air diffuser in which the light bulb is mounted therein and in which adjustable relation is provided between the passive light diffuser and the light bulb mounting therein.

Referring now to the drawings, there is shown a passive light fixture and air diffuser unit 10 comprising a duct 12 which may be either circularly or rectangularly configured, but for the purpose of convenience is shown in FIGURE 1 as being a cylindrical or circular configured duct. The duct 12 terminates in a flange 14 shown in FIGURES 2 and 4, and which is secured to a ceiling 16 by any well-known conventional means.

A spider 20 and an annularly disposed flared component 22 are each supported by common screws 24, 24 shown in each of FIGURES 2, 4 and 6. The spider is disposed to have a hub element 26 centrally disposed of the spider and there is an axial opening extending through the hub 26 to allow a stem 30 to cooperatively engage the opening in the hub 26. The stem 30 is essentially a hollow shaft through which may pass electrical wiring from a light socket that may be disposed at the lower end of the stem 30 to a source of electrical current that is reached by other electrical wiring disposed in the ceiling and as shall be described hereinbelow.

The peripheral portions of the flared component 22 extend ceiling-ward at the peripheral portions thereof so that the flared portion finally extends in a radial direction back toward the ceiling. The lower portion of the flared component 22 is conveniently flared to be disposed in a substantially or generally tangential relationship with a light diffuser 32, shown in FIGURES 2, 3, 4 and 6. The light diffuser 32 has an opening centrally disposed therein and the stem 30 is fixedly secured thereto by the positive action of plate 34, washer 36, and nut 38, as particularly shown in FIGURES 2 and 6, and generally illustrated in FIGURE 4. The plate 34 may be held in place by being threadedly engageable upon the stem 30, as shown in FIGURE 6, or the plate 34 may rest upon an ornamental or control knob 40 shown in FIGURES 2, 3 and 4. The knob 40 provides also an ornamental or design characteristic to the light diffuser 32, and the embodiment shown in FIGURES 2, 3 and 4 are such that the light diffuser 32 is a passive reflector of the light due to the generally curved configuration thereof and the generally reflective surface that it may have.

Near the upper end of the shaft or stem 30 there is provided a fixedly secured ring 50 that annularly engages the surface of the shaft 30 and is retained in place by a set screw 52. When the shaft is in its lowered position as shown in FIGURE 2, the ring 50 rests against the upper edge of the hub 26 and the shaft is thus prevented from dropping to any lower position, until appropriate adjustment is made by proper loosening and retightening of set screw 52. The stem 30 has a smooth surface throughout its length as shown in FIGURES 2 and 4, and particularly exemplified in FIGURE 5. By the smooth surface of the stem 30, a positive action element resulting from the spring effect of a holding pin 58 is provided so that the stem will remain in place, and a spring or holding pin 58 is secured to the hub 26 so that a straight portion of the holding pin 58 engages and holds onto any given portion of the stem 30. Where it is desirable to adjust the stem 30 upwardly or downwardly, the control knob 40 is pushed or pulled along its axis until the given location is found, so that the straight portion of the pin 58 rides and holds the stem 30 in place by the bias effect of the holding pin 58, and the straight portion of the pin 58 is thus resting upon the cylindrical surface of the stem 30. Now the stem 30 may be lowered to any desired position until the ring 50 engages the hub 26, or the stem 30 may be conveniently raised until the light diffuser 32 engages the flared component 22. While the stem 30 is in any of its lowered positions, air currents 66, 66, shown in FIGURE 2, may readily pass downwardly of the duct 12 and between the peripheral tangential surfaces of the light diffuser 32 and the flared component 22. In the condition that the stem 30 is in its upwardmost fixed position, as shown in FIGURE 4, there is no passage of air through the duct 12 since the flared component 22 is tangentially engaging the peripheral surface, in a substantial fashion, with the light diffuser 32. Thus it is seen that adjustments may be made in a positive fashion, and the stem may be secured and also a positive arrangement by the pin 58 resiliently engaging the stem 30, in which the adjustment is made between positions and to each of the fixed positions resulting from the pin engaging the stem.

Beneath the light diffuser 32, the stem 30 may be extended as shown in FIGURE 6, so that a light fixture 70, 70 may be mounted thereon by coupling means 72. Wiring 74, 74 may extend throughout a substantial length of the stem 30 so that it leads from the light fixture 70, 70 upwardly along the interior of the stem 30 and eventually to a plug or socket 76 that is mounted along a given peripheral portion of the duct 12. The lower end of the stem 30 terminates in a control ring 80 that is operable in a similar fashion to the control knob 40 of FIGURES 3 and 4, and upon grasping the control ring 80 of FIGURE 6, the stem 30 slides so that the holding pin 58 may engage any given portion of the stem. The ring 80 is threadedly secured to the end of stem 30 and an apertured light diffuser 82 is hsown for encompassing or substantially enclosing the light fixtures 70, 70. Although the light fixture 32 is shown forming a gap at the peripheral portion with the peripheral edge of the apertured light diffuser 82, it is within the scope of the present invention to provide these components in mating or touching relation.

One of the essential features of the holding pin 58 is that it is provided with the straight side thereof for engaging a point on the stem, and the straight side of the holding pin is resiliently constructed to return to the position as shown in FIGURE 1 after it has been made to pass along the curved peripheral portion of the stem 30. Thus, after the straight portion of the holding pin resides along the contoured periphery of the stem, when a desired point is reached, the resilient effect of the holding pin 58 is such that the straight portion holds and retains the stem 30 in place. In this way, the arrangement provides positive action in adjustment as well as in positive control in holding the stem 30 in one of the several given positions.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:

1. A combination light fixture and air diffuser comprising a duct opening into a room and having a flared terminal portion thereof, a spider mounted in said duct inwardly from the flared terminal portion thereof and having a hub centrally disposed thereof, a stem perpendicularly disposed to said spider and extending through an opening thereof in mounted relation with respect to said hub, a light reflecting shell mutually flared and mounted from a lower portion of said stem and tangentially disposed to the terminal portion of the duct for closing the air passage through the duct when they are mutually contacting each other, and a holding pin disposed to provide positive adjustment of said stem in any one of several positions that may engage one side of said holding pin, said stem capable of being positively adjusted along its axis for increasing the air flow through said duct, a light bulb and socket arrangement centrally disposed and mounted in said light reflecting shell, an apertured light diffuser encompassing said light bulb and socket, and wherein light power to objects positioned below said light bulb receive increased light power upon lowering of the light reflector shell.

2. The invention according to claim 1 wherein an electrical plug is mounted at one side of said duct, said light bulb is mounted at the other end of said stem, and electrical wiring is disposed connecting the light bulb to the electrical socket.

3. A combination light fixture and air diffuser comprising a duct opening into a room and having a flared terminating portion, a spider mounted in said duct inwardly from the flared terminating portion and having a hub centrally disposed thereof, a stem perpendicularly and slidably disposed with respect to said hub, a light fixture means mounted on said stem, a holding pin having a resiliently constructed straight side and said holding pin secured with respect to said hub, and said straight side of the holding pin being adapted to be retained in one of any given positions on said stem as a result of the resiliency of said pin, a fixedly secured ring disposed at the upper end of the stem for terminating the movement of the stem in its lower direction in which the peripheral portion of the light reflecting shell is tangentially disposed to the flared terminal portion of the duct, and for closing the passage of air from the duct when they are mutually contacting each other.

References Cited by the Examiner

UNITED STATES PATENTS 2,190,937 2/1940 Demuth _____ 98—40 X
2,577,569 12/1951 Demuth _____ 98—40 X
2,671,395 3/1954 Demuth _____ 98—40

FOREIGN PATENTS 3,955 4/1892 Sweden.

MEYER PERLIN, *Primary Examiner.*

ROBERT A. O'LEARY, *Examiner.*

W. E. WAYNER, *Assistant Examiner.*